US009389884B2

(12) United States Patent
Dharawat et al.

(10) Patent No.: US 9,389,884 B2
(45) Date of Patent: Jul. 12, 2016

(54) METHOD AND APPARATUS FOR PROVIDING ADAPTIVE WALLPAPER DISPLAY FOR A DEVICE HAVING MULTIPLE OPERATING SYSTEM ENVIRONMENTS

(71) Applicant: Motorola Mobility LLC, Libertyville, IL (US)

(72) Inventors: Parikshit Dharawat, Sunnyvale, CA (US); Ji Hye Jung, Seoul (KR)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 137 days.

(21) Appl. No.: 13/649,556

(22) Filed: Oct. 11, 2012

(65) Prior Publication Data

US 2014/0108951 A1   Apr. 17, 2014

(51) Int. Cl.
 *G06F 3/00* (2006.01)
 *G06F 9/445* (2006.01)
 *G06F 9/54* (2006.01)

(52) U.S. Cl.
 CPC .............. *G06F 9/4451* (2013.01); *G06F 9/543* (2013.01)

(58) Field of Classification Search
 None
 See application file for complete search history.

(56) References Cited

U.S. PATENT DOCUMENTS

| | | | | |
|---|---|---|---|---|
| 6,804,718 | B1* | 10/2004 | Pang | G06F 9/54 709/224 |
| 7,636,586 | B2* | 12/2009 | Maaniitty | G06F 9/4443 455/419 |
| 8,195,624 | B2* | 6/2012 | Yang | G06F 17/30168 707/687 |
| 8,233,879 | B1* | 7/2012 | Lee | H04L 41/00 455/405 |
| 8,392,498 | B2* | 3/2013 | Berg | H04J 3/0667 709/202 |
| 8,549,273 | B1* | 10/2013 | Deetz | G06F 9/4401 713/1 |
| 2006/0031407 | A1* | 2/2006 | Dispensa | H04L 29/12009 709/219 |
| 2006/0155669 | A1 | 7/2006 | Huang et al. | |
| 2007/0024916 | A1* | 2/2007 | Choi | G06F 3/04845 358/3.29 |
| 2008/0201659 | A1* | 8/2008 | Shen | G06F 9/4443 715/778 |
| 2010/0115254 | A1* | 5/2010 | Deng | G06F 9/44505 707/620 |

(Continued)

OTHER PUBLICATIONS

Hung et al., "An Online Migration Environment for Executing Mobile Applications on the Cloud" Innovative Mobile and Internet Services in Ubiquitous Computing (IMIS), 2011 Fifth International Conference on, IEEE, Jun. 30, 2011, pp. 20-27.

(Continued)

*Primary Examiner* — Hua Lu
(74) *Attorney, Agent, or Firm* — McDermott Will & Emery LLP (57) ABSTRACT

A disclosed method detects user input to set wallpaper of a first operating system environment using an image data file, and sends the image data file from the first operating system environment to a second operating system environment along with a request to update wallpaper of the second operating system environment. The two operating system environments are independent and utilize a common kernel. The method sets the wallpaper of the second operating system environment using the image data file. The method may also establish a bi-directional client-server communication channel between the operating system environments, and send the request to update wallpaper of the second operating system environment via the bi-directional client-server communication channel. An apparatus that performs the method includes a programmable processor, and memory containing executable instructions. The processor runs multiple operating system environments utilizing a common kernel.

22 Claims, 7 Drawing Sheets

(56) References Cited

U.S. PATENT DOCUMENTS

| | | | | |
|---|---|---|---|---|
| 2011/0084986 A1* | 4/2011 | Kim | ...................... | G06F 3/0481 345/660 |
| 2011/0087868 A1* | 4/2011 | Bowler | ................ | G06F 9/4451 713/1 |
| 2011/0119610 A1* | 5/2011 | Hackborn | ............. | G06F 3/0481 715/768 |
| 2011/0246904 A1* | 10/2011 | Pinto | ...................... | G06F 9/4445 715/740 |
| 2011/0304636 A1* | 12/2011 | Tsai | ...................... | G06T 11/001 345/522 |
| 2012/0005691 A1* | 1/2012 | Wong | ...................... | G06F 9/541 719/319 |
| 2012/0036450 A1* | 2/2012 | Canton | ............. | H04M 1/72527 715/748 |
| 2012/0081353 A1* | 4/2012 | Yusupov | ............. | H04L 67/1095 345/418 |
| 2012/0084792 A1* | 4/2012 | Benedek | ................. | G06F 9/544 719/313 |
| 2012/0102428 A1* | 4/2012 | Stewart | ................... | G06F 3/038 715/781 |
| 2012/0150970 A1* | 6/2012 | Peterson | ............. | G06F 3/04817 709/206 |
| 2012/0173986 A1* | 7/2012 | Jung | ................... | G06F 9/45533 715/733 |
| 2012/0174212 A1* | 7/2012 | Dart | .................... | G06F 9/44505 726/19 |

OTHER PUBLICATIONS

Patent Cooperation Treaty, "PCT Search Report and Written Opinion of the International Searching Authority" for International Application No. PCT/US2013/061799 dated Dec. 2, 2013, 10 pages.

APPSENSE, User environment management with Citrix XenDesktop, May 18, 2012, 2 pages.

* cited by examiner

METHOD AND APPARATUS FOR PROVIDING ADAPTIVE WALLPAPER DISPLAY FOR A DEVICE HAVING MULTIPLE OPERATING SYSTEM ENVIRONMENTS

FIELD OF THE DISCLOSURE

The present disclosure relates generally to operating systems and devices having multiple operating system environments.

BACKGROUND

Various operating systems provide features and applications that are often specific to the given operating system. For this reason, it has become useful for computing devices, including handheld mobile devices, to be capable of running more than one operating system environment. By running more than one operating system environment on a device, users are able to access the features and applications associated with each of the operating system environments, thereby enhancing the capabilities and functions of the device.

In the past, virtualization techniques have been used to accomplish running multiple operating system environments; however such approaches require emulation of an entire machine which is resource intensive. Systems have now been developed that enable actual running of multiple operating system environments without the need for such resource intensive machine emulation. Such systems utilize a common kernel where the operating system environments may be considered middleware, in that, some services related to the various applications may be supported within the confines of the environment. Therefore, in these systems, the operating system environments co-exist independently, and do not require virtualization as in the past. Devices supporting these multiple environments therefore enable users to access and enjoy the features of the operating systems and their associated data such as applications.

Nevertheless, some demarcation between the operating system environments continues to exist for the purpose of presentation to the device user. The environments usually provide their own unique approach to how associated data is displayed by the operating system. In some cases, the user may be compelled to switch display views in order to work with one or another operating system environment. Being forced to switch views in this manner negatively impacts user experience because the work or operating contexts in which the user was engaged can be lost or muddled among the various views. Furthermore, any given operating system environment will not understand, and therefore will be incapable of interpreting, data associated with a different operating system environment and any associated data or working context.

DETAILED DESCRIPTION

The disclosed embodiments provide better interoperability between multiple operating system environments. In the embodiments, when a user attempts to change the background wallpaper in a first operating system environment, the image data file is captured and, if necessary, converted to a format that can be used by a second operating system environment, including, if necessary, adjusting the size and scale of the resulting wallpaper image to fit appropriately into a display. The second operating system environment then receives the converted image data file and uses it to set wallpaper. As a result, the user experience in working with multiple operating system environments is enhanced.

A disclosed method includes detecting user input to set wallpaper of a first operating system environment using an image data file, and sending the image data file from the first operating system environment to a second operating system environment along with a request to update wallpaper of the second operating system environment. The two operating system environments are independent from each other and both utilize a common kernel. The method sets the wallpaper of the second operating system environment using the image data file.

The method may also include establishing a bi-directional client-server communication channel between the first operating system environment and the second operating system environment, and sending the request to update wallpaper of the second operating system environment, from the first operating system environment to the second operating system environment via the bi-directional client-server communication channel.

The method may include transcoding the image data file to a file format useable by the second operating system environment, and sizing and scaling the wallpaper so that the wallpaper can be displayed within at least one home screen of a plurality of home screens of the second operating system environment.

The method may include executing wallpaper setup logic that has a first module contained with the first operating system environment and a second module contained within the second operating system environment. The bi-directional client-server communication channel is then established between the first module and the second module.

The method may also store the image data file to local memory cache, after obtaining the image data file from the first operating system environment. The method may detect the user input by the first module and update a file path for the image data file.

The disclosed embodiments include an apparatus that has at least one processor and main memory operatively coupled to the processor. The main memory contains executable instructions for execution by the processor, that when executed, cause the processor to send an image data file obtained from a first operating system environment to a second operating system environment along with a request to update wallpaper of the second operating system environment. This is done in response to user input to set wallpaper of the first operating system environment using the image data file. The processor will also set the wallpaper of the second operating system environment using the image data file, and perform other operations of the embodiments described herein. The apparatus may include cache memory operatively coupled to, or integrated with, the processor, and a display operatively coupled to the processor.

The embodiments also include a computer readable, non-volatile, non-transitory memory, storing executable instructions for execution by at least one processor, that when executed cause the at least one processor to perform the various methods and operations of the embodiments as described herein.

Figure 1:
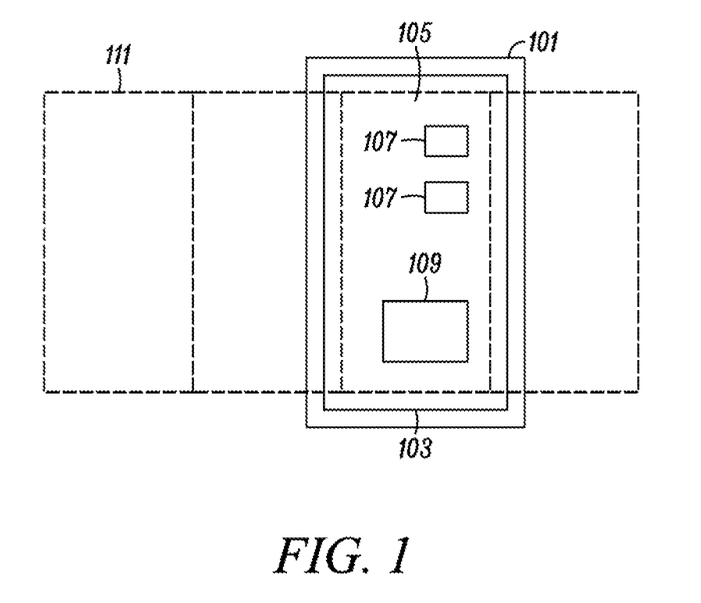
FIG. 1 is a block diagram of a mobile device display with a display image having various image content associated with a first operating system environment.

Turning now to the drawings wherein like numerals represent like components, FIG. 1 illustrates a mobile device 101, which includes an integrated display 103. The integrated display 103 may display a background image, such as wallpaper, on an active home screen 105, shown as a dotted line around the perimeter of the integrated display 103. The mobile device 101 may also be capable of displaying various other "home screens" 111 that provide scrollable panels for organization of application icons 107 and windows and/or widgets 109. The home screens 111 may allow the user to launch an application within the perimeter of the active home screen 105, by, for example, clicking a mouse cursor or using a touch screen capability to active one of the desired application icons 107. Additionally, scrolling to another home screen may also allow scrolling between such launched applications. The home screens 111 and the active home screen 105, are associated with a first operating system environment. The home screens 111 may be scrolled and various visual image objects such as application icons 107 or widget 109 present on the active home screen 105, may be moved about using a graphical user interface (GUI), that may include touch screen functionality, a track ball, or any other suitable user interface for selecting and moving image objects. The background image of active home screen 105 may be wallpaper using an image obtained from another operating system environment. In other words, the wallpaper used by the home screens 111 and displayed on active home screen 105 may be displayed using the associated first operating system environment, which may be a Linux® based operating system environment such as, but not limited to, Android™, Ubuntu®, etc.

Figure 2:
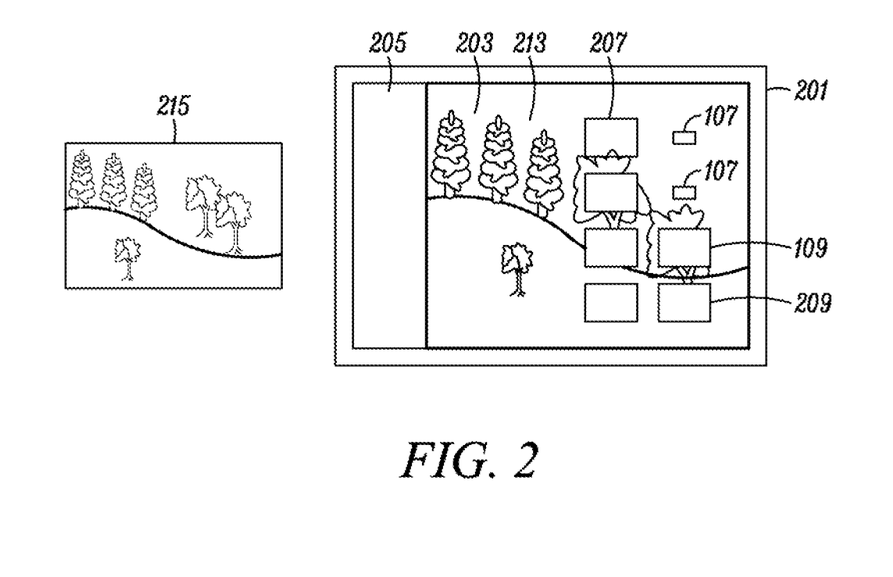
FIG. 2 is block diagram of a display having a combined image employing at least two different operating system environments concurrently, and displaying a wallpaper image.

The mobile device 101 may interact with a larger display 201 as shown in FIG. 2 by, for example, attaching to the larger display 201 via a docking port. The larger display 201 may provide an enhanced user experience by allowing the user of mobile device 101 to have better a better view of various applications, etc., such as a Web browser, and/or providing additional user interface features such as a full size keyboard. The larger display 201 may display information associated with two or more operating system environments. For example, the application icons 107 and widget 109 of a first operating system environment may be displayed along with various icons 207, widgets such as widget 209, and a toolbar 205, which are associated with a second, different operating system environment. The displayed image may include wallpaper 203 as a background image, which may be displayed in an active workspace 213. The wallpaper 203 is a displayed image data file 215, which is shown in this example as nature scenery. The image data file 215 may be obtained by downloading, such as via a Web browser, or from some other source such as pictures stored in memory. The wallpaper 203 is associated with the first operating system environment of mobile device 101. Some of the image objects displayed on (or hovering over) the wallpaper 203, may be associated with a second, third, etc., operating system environment. The mobile device 101 may use one or more operating system environments together, or launch additional operating system environments as needed. Therefore, the display 201 may display a combined image providing information from one or more operating system environments.

The term "display" as used herein refers to a device that displays "display data" such as an "image data file" to form a displayable image or displayable images, such as, but not limited to, a picture, a computer desktop, a gaming background, a video, an application window etc. Examples of a display include a television, computer monitor, etc., or an integrated display as found in electronic devices such as a laptop computer, handheld computing device, mobile telephone, PDA, etc. The display device may employ any appropriate display technology, such as for example, a CRT, LCD flat panel, LED flat panel, plasma screen, etc.

The terms "screen," "home screen," and "workspace" are used interchangeably in reference to an "image" which refers generally to what is "displayed" on a display. That is, an image, including a "screen," "home screen," and/or "workspace" may be displayed on a display. Examples of images include, but are not limited to, a computer desktop (i.e. a background), a gaming background, a video, an application window, an icon, a widget, etc., including also the wallpaper described herein. In other words, the term "image" may refer to a background, or may refer individually, or collectively, to elements or objects in the foreground, of hovering over, a background image such as the wallpaper. The term "display data" is used interchangeably herein with the term "image data" and refers to the information (data, or digital information) that the display interprets and/or decodes to show (i.e. to display) the user an image such as a workspace or home screen, as well as any associated elements or objects in the foreground of home screens or workspaces, or the live wallpaper, etc. An "active" home screen or "active" workspace is the home screen or workspace currently being displayed. For example, in FIG. 1, the active home screen 105 is displayed although other home screens 111 could be scrolled to and displayed thereby becoming an "active" home screen.

The term "data" as used herein, and in contrast to "display data" and "image data," may refer to files (i.e. data files) such as executable application files, widgets, video files, documents, photographs, etc. without limitation, or to text data, such as, for example, words copied and pasted from a document.

In the example of FIG. 2, the display 201 displays a combined image that includes display data from a first operating system environment and a second operating system environment. The wallpaper 203 may be obtained using one operating system environment, for example by downloading using a browser, and may be displayed by a different, second operating system environment. Therefore, the first operating system environment may be used to download an image data file such as image data file 215 (i.e. a nature scenery or some other picture) and the second operating system environment may be used to set and display the image data file 215 as wallpaper 203. Both the first and second operating system environments may be interacted with through various icons and windows such as application icons 107, 207 and widgets 109, 209, which "hover" over the wallpaper 203.

As mentioned briefly above, the mobile device 101 first operating system environment may provide various "home screens" 111 that enable the user to organize application icons 107 and widgets 109. In other words, various icons and widgets may be distributed between the various home screens 111. The background image, i.e. wallpaper, may include home screen objects (i.e. icons 107 and widget 109), that are associated with one of several home screens.

The combined image displayed on display 201, may include all icons, widgets, etc., from all of the home screens 111. However, when displayed only on the integrated display 103 of the mobile device 101, the icons and widgets may be distributed according to their corresponding home screens 111 as configured by the mobile device 101 user. In some embodiments, the home screens 111 of the first operating system environment may be mapped to workspaces of the second operating system environment. In this example, the wallpaper 203, may be appropriately sized and scaled to fit within the perimeter of the display 201, and may show a home screen of the first operating system environment. In this example, only the icons and widgets that the user associated with the displayed home screen would be displayed on the display 201, until the user toggled to another mapped workspace/home screen. That is, any windows that may be associated with a workspace of the second operating system would also be displayed when that workspace is mapped with the given home screen.

The wallpaper 203 in the above described scenarios is displayed on display 201 by being sized and scaled to fit within the perimeter of the display 201. However, a challenge exists when attempting to set wallpaper on the home screens 111 of the mobile device 101. Among various advantages of the embodiments, background wallpaper may be set for the mobile device home screens 111, regardless of which application and which operating system environment is used to obtain the image data file, and also regardless of the image data file format or scaling.

Figure 3:
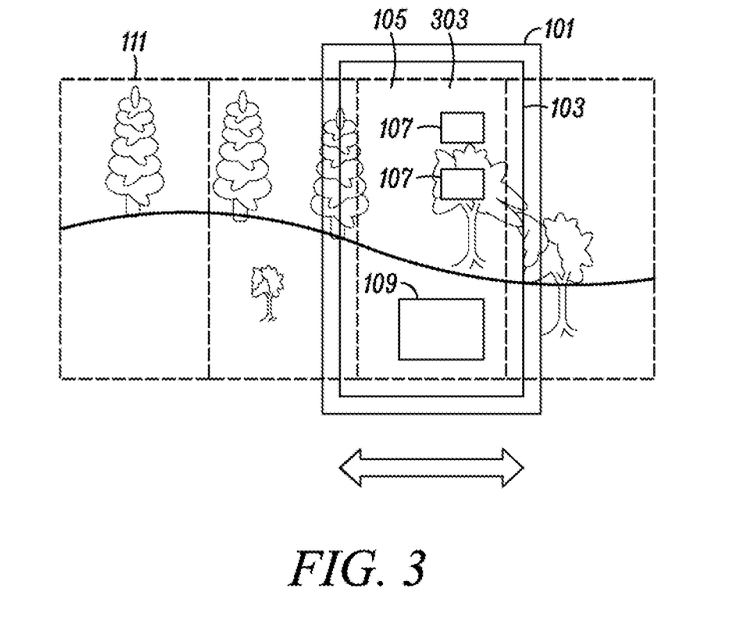
FIG. 3 is a block diagram illustrating an example of mobile device display displaying a wallpaper image in accordance with some embodiments.

FIG. 3 shows one approach of the embodiments for handling an image data file 215 that is set as wallpaper 303. As shown in FIG. 3, the image data file 215 has been scaled and adjusted to fit across the home screens 111 to form a contiguous picture, that is, contiguous across the home screens 111. The user may scroll the home screens 111 left or right to scroll through the scenery picture. In the example of FIG. 3, only a portion of the picture is shown within the active home screen 105. Alternatively, the picture may be sized to fit in a "center" home screen, such as a center home screen of a set of an odd number of home screens. The picture may also be rotated to better fit within the perimeter of the integrated display 103 on the active home screen 105. The embodiments perform this scaling and fitting of the picture automatically, without any input from the user.

In accordance with an embodiment, the first operating system environment, or more specifically, the operating system environment that is used to download or obtain the image data file 215, may obtain contextual information such as metadata associated with the image data file 215, to inform a wallpaper setup logic of the mobile device 101 that the image data file 215 is to be setup as wallpaper. By having the contextual information which may include the image data file's file extension name the wallpaper setup logic may determine that the image data file is in a certain format, such as ".svg," ".png," a bitmap, ".jpg," ".gif," etc., such that appropriate transcoding can be applied to transcode the image data file for use by the second operating system environment. Among the advantages of the embodiment illustrated by FIG. 3, user experience is enhanced because the user can use a desired browser of one operating system environment to obtain wallpaper that can be setup by a different operating system environment, or vice versa, and install the wallpaper in a straightforward and seamless manner. That is, the embodiments enhance interoperability of multiple operating system environments.

Figure 4:
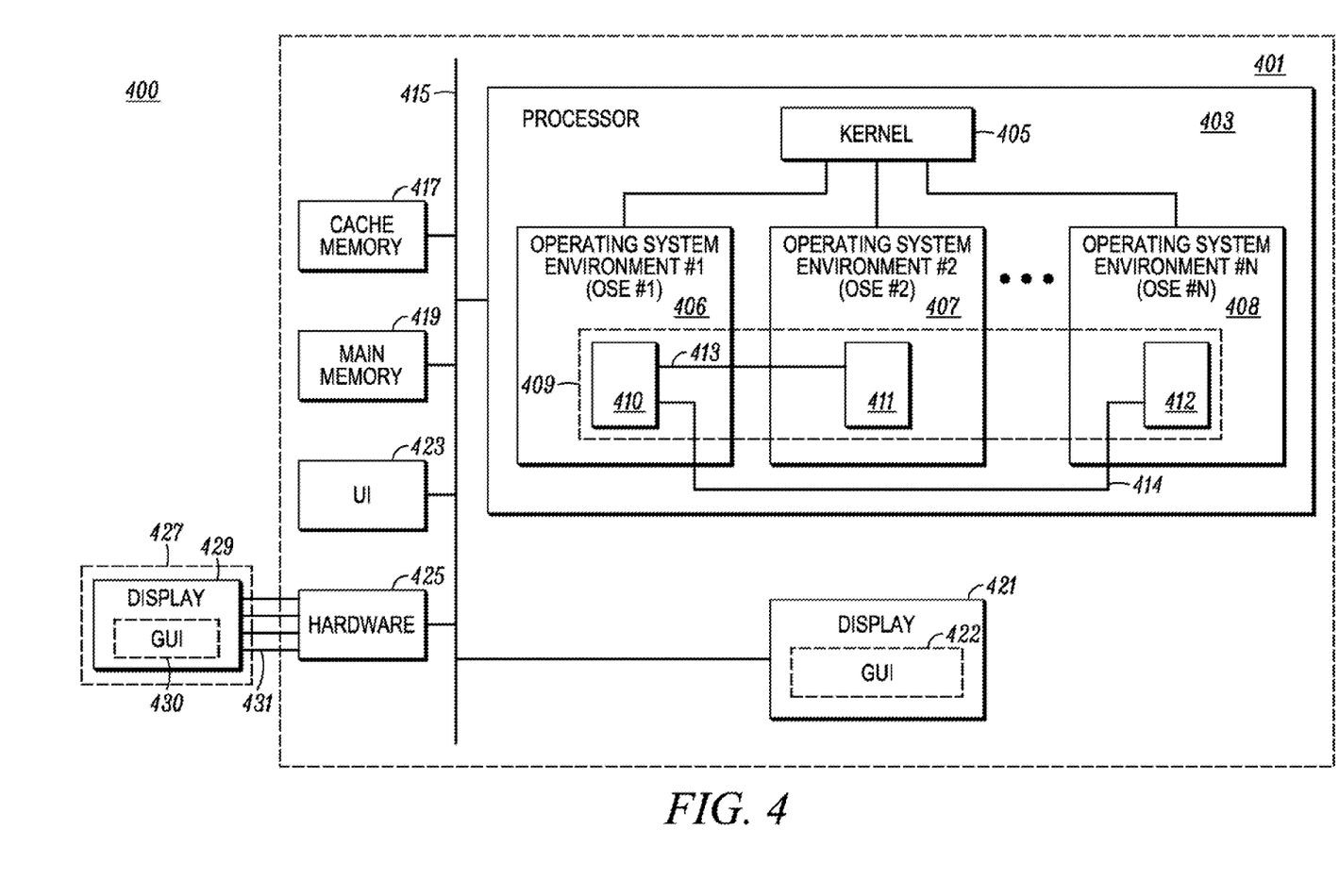
FIG. 4 is diagram of an apparatus with a plurality of operating system environments, a single kernel and wallpaper setup logic in accordance with an embodiment.

FIG. 4 illustrates a block diagram of a system 400 in accordance with an embodiment. The system 400 includes a mobile device 401 which is one type of apparatus in accordance with an embodiment. The mobile device 401 is operatively connected via a communication bus 431 to a peripheral device 427 that may include a larger display 429 that is larger than the integrated display 421. As mentioned briefly above, in some embodiments, the system 400 may include the peripheral device 427 which may further have a docking station, such that the mobile device 401 may be docked within the peripheral device 427 and obtain the benefit of the larger display 429 as well as other possible peripheral functions such as, for example, a full size keyboard. The Motorola Lapdock™ product is one example of such a system. The larger display 429 may also provide a graphical user interface (GUI) 430 to enable a user to interact with the larger display 429 when the mobile device 401 is docked with the peripheral device 427.

The mobile device 401 includes at least one processor 403 (such as a CPU) and may include other processors such as, but not limited to, a graphics processing unit (GPU), all of which are operatively coupled via a communication bus 415. The processor may be a programmable processor that executes instructions (i.e. software or firmware) stored in memory, to perform various operations. The communication bus 415 may run throughout the mobile device 401, providing operative coupling to the various components and circuitry contained within the mobile device 401. Therefore, in accordance with embodiments, device components, circuitry, and the like, may be operatively coupled via the communication bus 415. In other words, various intervening device components, circuitry, and the like, may exist in between, and/or along, the communication path between any two or more operatively coupled components. As shown in FIG. 4, the processor 403 is operatively coupled, by the communication bus 415, to cache memory 417, main memory 419, user interface (UI) 423, hardware 425 used for coupling to peripheral device 427, and integrated display 421. The integrated display 421 may display and serve as a graphical user interface (GUI) 422 that has touch screen functionality among other features. The cache memory 417 may be separate as shown, or, may be integrated with processor 403 in some embodiments. The UI 423 may include a track ball mouse, touch sensitive elements, physical switches, gyroscopic position sensors, etc.

In accordance with the embodiments, the processor 403 may run various operating system environments such as operating system environment #1 (OSE #1) 406, operating system environment #2 (OSE #2) 407, and so on through operating system environment #N 408 (OSE #N, i.e. an N-th operating system environment). In other words, the processor 403 is operative to run one or more of the various operating system environments 406 through 408, concurrently. The plurality of operating system environments are each completely autonomous and can exist and function independently from one another. One or more of the operating system environments may be run concurrently, and each operating system environment utilizes a common kernel 405. In other words, each one of the operating system environments is completely autonomous and may exist and function completely independently, without any of the other operating system environments being executed. The operating system environments provide "environments," in that, for example, all necessary libraries, toolkits, windowing, etc., is present within the environment to enable an application associated with the operating system environment to function. The common kernel 405 provides fundamental interaction at the hardware level of mobile device 401. For example, the common kernel 405 may provide required operating system tasks such as program loading, system resource allocation, handling device input and output, and some memory management functions. The common kernel 405 may be created as an object-oriented design that can interface, and enable communication with, programming objects within the various operating system environments. Examples of operating system environments include, but are not limited to, Android™, Ubuntu®, other Linux® based operating systems, etc.

The mobile device 401 includes wallpaper setup logic 409 in accordance with the embodiments. The wallpaper setup logic 409 may be contained within one or more of the various operating system environments such as OSE #1 406, OSE #2 407 and OSE #N 408 as shown. However, the wallpaper setup logic 409 may also exist independently from any of the operating system environments in some embodiments. The wallpaper setup logic 409 is operatively coupled to the main memory 419 and also to cache memory 417 via the communication bus 415. That is, the wallpaper setup logic 409 communicates with the cache memory 417, the main memory 419 and the integrated display 421 via the communication bus 415.

The wallpaper setup logic 409 may obtain an image data file for the wallpaper in a variety of ways. One way is that the user may download a "wallpaper" file from the Internet using a Web browser that is associated with one of the operating system environments. Another way is that the user may use an image data file stored in main memory 419 and attempt to use the image data file as the wallpaper image. Either way, the wallpaper setup logic 409 operation is similar. For example, the user may activate a wallpaper setting application associated with OSE #1 406 and attempt to setup wallpaper using an image data file. In accordance with the embodiments, the wallpaper setup logic 409 will detect the user's actions and will pass information from OSE #1 406 to OSE #2 407, for example. The information may include contextual information such as metadata and including file type information related to the image data file format.

In some embodiments, the wallpaper setup logic 409 may be object oriented software or firmware that is executed by processor 403 only when more than one operating system environment is executed by the processor 403. The term "logic" as used herein may include software and/or firmware executing on one or more programmable processors (including CPUs and/or GPUs), and may also include ASICs, DSPs, hardwired circuitry (logic circuitry), or combinations thereof. For the example embodiment illustrated by FIG. 4, the wallpaper setup logic 409 may be executable instructions stored in main memory 419, which is a non-volatile, non-transitory memory. Furthermore, the operating system environments 406, 407, 408, and the common kernel 405, may also consist of executable instructions that are executed by the processor 403, and that are stored in main memory 419 for access by the processor 403 as necessary.

Although the example provided by FIG. 4 illustrates the operating system environments, common kernel 405, and also the wallpaper setup logic 409 as executed by the processor 403, which is located on the mobile device 401, this functionality may also be alternatively, partially or collectively, located within the peripheral device 427. In other words either the peripheral device 427 or the mobile device 401 may contain some of, all of, or various components of, the logic and other functionality described with respect to FIG. 4 and would still remain in accordance with the embodiments herein disclosed. In other words, an apparatus in accordance with the embodiments may be the system 400, or may be the mobile device 401 individually, or the peripheral device 427 individually. Furthermore, wallpaper setup logic 409 may be distributed among the various operating system environments as shown in FIG. 4, or may be independent from the operating system environments, or may be integrated into the common kernel 405 in some embodiments.

As shown in the example embodiment of FIG. 4, the wallpaper setup logic 409 may be distributed as "modules" among two or more operating system environments. That is, in some embodiments, the modules may be components of executable instructions that cooperate to implement the wallpaper setup logic 409. For example, one of the operating system environments, such as OSE #1 406, may include a first module of wallpaper setup logic 409, namely, synchronization and configuration module 410. The other operating system environments, such as OSE #2 407 and OSE #N 408, may include a second module and a third module of wallpaper setup logic 409, namely, synchronization handling and management modules 411 and 412, respectively. The synchronization and configuration module 410 communicates with the synchronization handling and management modules 411 and 412 via the respective bi-directional client-server communication channels 413 and 414.

Also it is to be understood that FIG. 4 is a diagram provided as an example that is not to be construed as a complete schematic diagram of a particular implementation of either a mobile device or the peripheral device. FIG. 4 is an example only and is for the purpose of describing to those of ordinary skill how to make and use the various embodiments. Therefore FIG. 4 is limited to showing only those components necessary to describe the features and advantages of the various embodiments to those of ordinary skill. It is to be understood that various other components, circuitry, and devices may be necessary in order to implement a complete functional apparatus and that those various other components, circuitry, devices, etc., are understood to be present by those of ordinary skill.

In some embodiments, the wallpaper setup logic 409 may operate at an application service level of the various operating system environments to pass image data file information including contextual information, notifications and requests between the environments. In some cases, providing contextual information may involve extracting and providing file metadata, file extensions, file format types, and/or image resolution and scaling information, to the receiving operating system environment such that the receiving operating system environment may be able to interpret and use an image data file as wallpaper. That is, the wallpaper setup logic 409 informs the receiving operating system environment of the correct file type and performs any necessary transcoding and scaling appropriate so that the receiving operating system can set the image data file as wallpaper for the integrated display 421.

In one example embodiment, one operating system environment may be an Android™ operating system environment and the second operating system environment maybe a Linux® based operating system environment. However, any of various operating system environments may be used, that operate with a common kernel in accordance with the embodiments.

Figure 5:
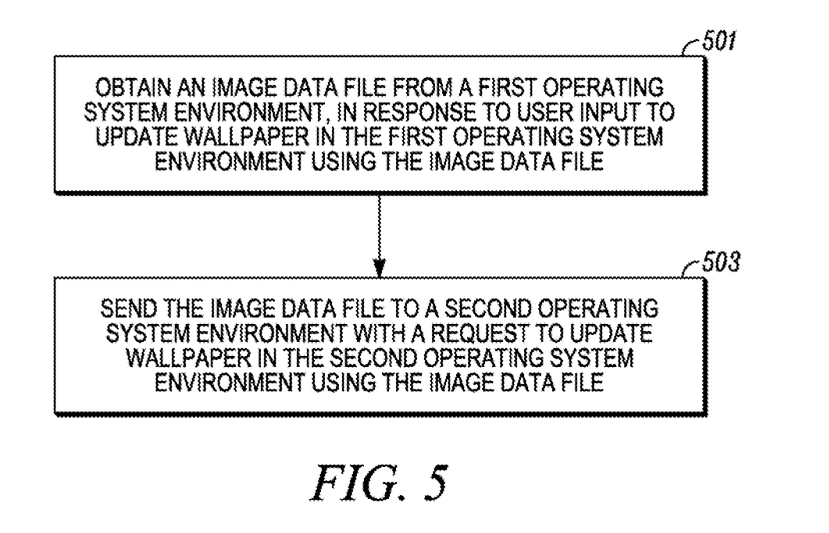
FIG. 5 is a flowchart illustrating high level operation of the embodiments.
Figure 6:
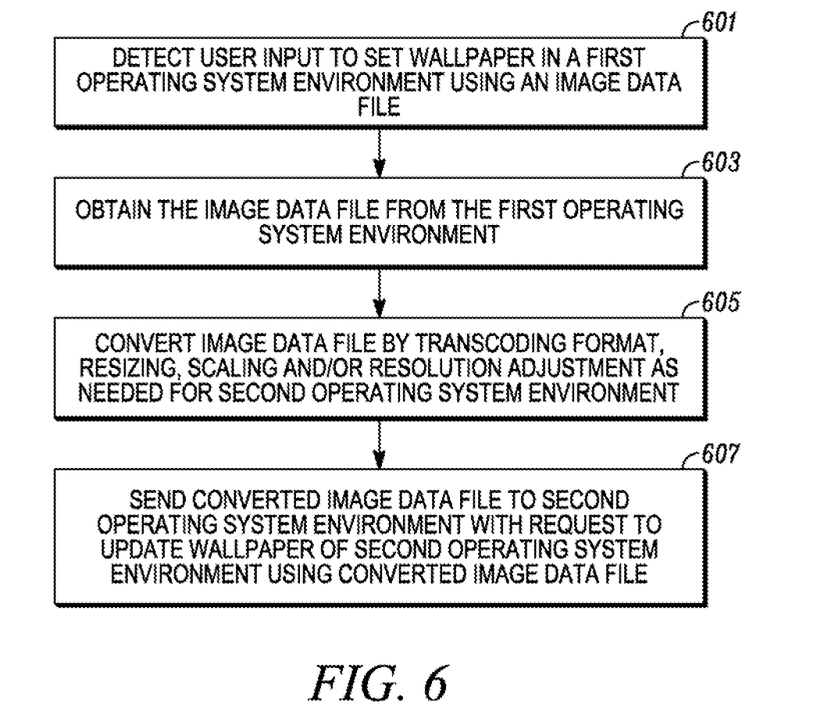
FIG. 6 is a flowchart illustrating high level operation of the embodiments.

The methods of operations of the various embodiments, at a high level, are shown by the flowcharts of FIG. 5 and FIG.

6. In FIG. 5, block 501, the wallpaper setup logic obtains an image data file from a first operating system environment, in response to user input to update wallpaper in the first operating system environment using the image data file. In the various embodiments, the background of the first operating system environment may not be shown. That is, any background image (i.e. wallpaper) display data that may be generated for the first operating system environment may be made transparent such that only the background from the second operating system environment is actually displayed to the user. In block 503, the image data file is sent to the second operating system environment with a request to update wallpaper for the second operating system environment using the image data file.

The user input may be detected by the wallpaper setup logic as shown in block 601 of FIG. 6. Upon detection of user input to change the first operating system environment wallpaper, the wallpaper setup logic may obtain the image data file from the first operating system as shown in block 603. In 605, the wallpaper setup logic may convert the image data file by transcoding its format, and/or by resizing, scaling, and/or adjusting the resolution as needed for the second operating system environment. In 607, the wallpaper setup logic may send the converted image data file to the second operating system environment with a request to update the second operating system environment wallpaper using the converted image data file.

Figure 7:
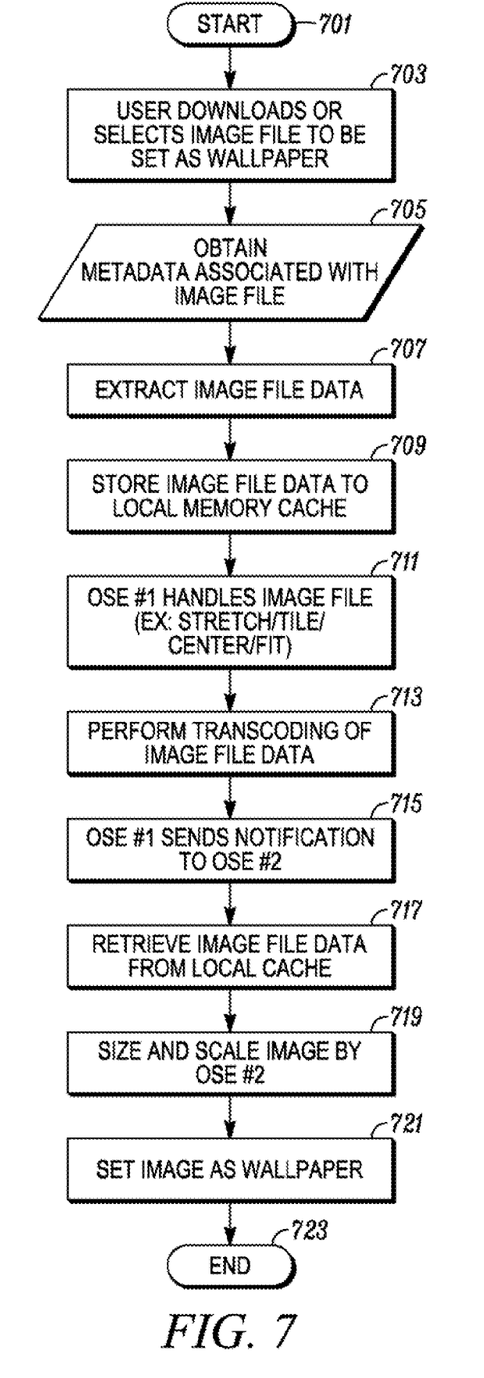
FIG. 7 is a flowchart illustrating further details of operation of an embodiment.

FIG. 7 is a flowchart that describes further details of operation with respect to an embodiment. The operation or method begins in block 701, and, in 703, a user may obtain an image data file to be set as wallpaper by either downloading or by selecting it from existing files stored in memory. In 705, the wallpaper setup logic 409 obtains metadata and other contextual information, such as file name, file type and extension, etc., associated with the image data file. The wallpaper setup logic 409 will then extract the image data file in 707 and store it to a local cache memory in 709. The OSE #1 may have some image file handling capabilities that OSE #2 does not support, such as, but not limited to, stretch, tile, center, fit, etc. In this case, OSE #1 may perform the image processing operations and then save the file as a new image that can be utilized by OSE #2. For example, in 711, OSE #1 may perform some image handling operation (i.e. stretch, tile, center, fit, etc.) and save the file. If needed, the OSE #1 will also transcode the image file data as shown in 713, to convert it to a format useable by OSE #2. The OSE #1 then sends a notification to OSE #2 to update the OSE #2 wallpaper in 715. The OSE #2 may then retrieve the image data file from the local cache memory in 717. The image file data may be further adjusted (i.e. sized and scaled) by OSE #2, if needed, as shown in 719. That is, the image may be resized and resealed in 719 so that it will fit appropriately within the device display, or within one or more homescreens. The image is then set as wallpaper in 721 and the process ends in 723.

Figure 8:
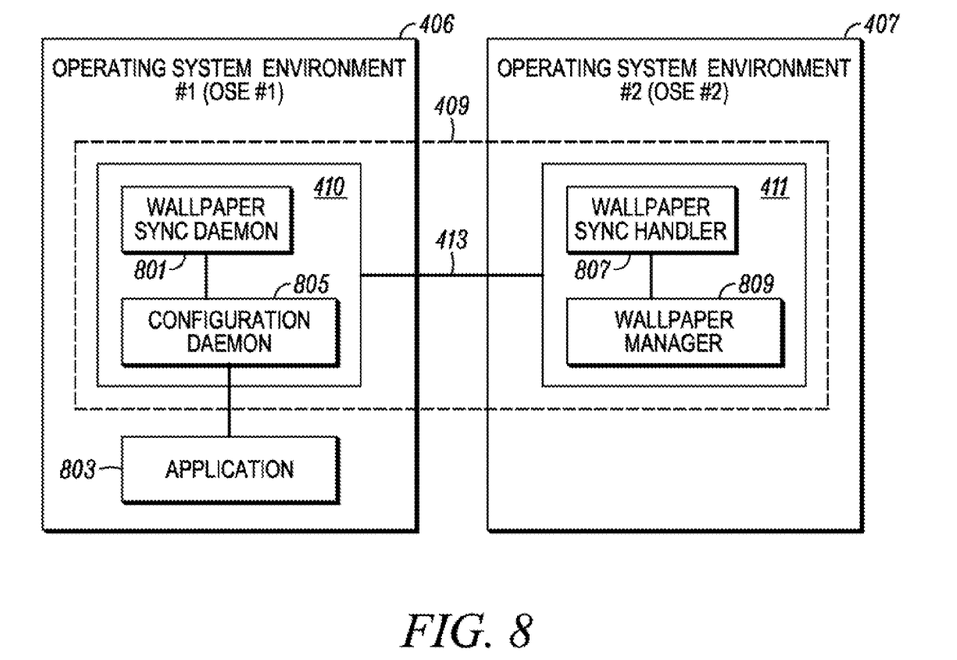
FIG. 8 is a diagram of two operating system environments showing further details of wallpaper setup logic in accordance with one embodiment.

FIG. 8 provides additional details of the synchronization and configuration module 410 and synchronization handling and management module 411. It is to be understood that the synchronization handling and management module 412 is similar to the synchronization handling and management module 411, and therefore only the synchronization handling and management module 411 need be described in detail herein. The synchronization and configuration module 410 may include a wallpaper sync daemon 801 operatively coupled to a configuration daemon 805. An application 803 of OSE #1 406 may be used to obtain an image data file and to initiate setting of a new desktop wallpaper. That is, the synchronization and configuration module 410 communicates with at least application 803 and possibly other applications of OSE #1 406.

The synchronization handling and management module 411 includes a wallpaper sync handler 807 and a wallpaper manager 809. The bi-directional client-server communication channel 413 provides for command, request and data exchange between the synchronization and configuration module 410 and the synchronization handling and management module 411. An example of operation in accordance with an embodiment is shown in the message flow diagram of FIG. 9.

Figure 9:
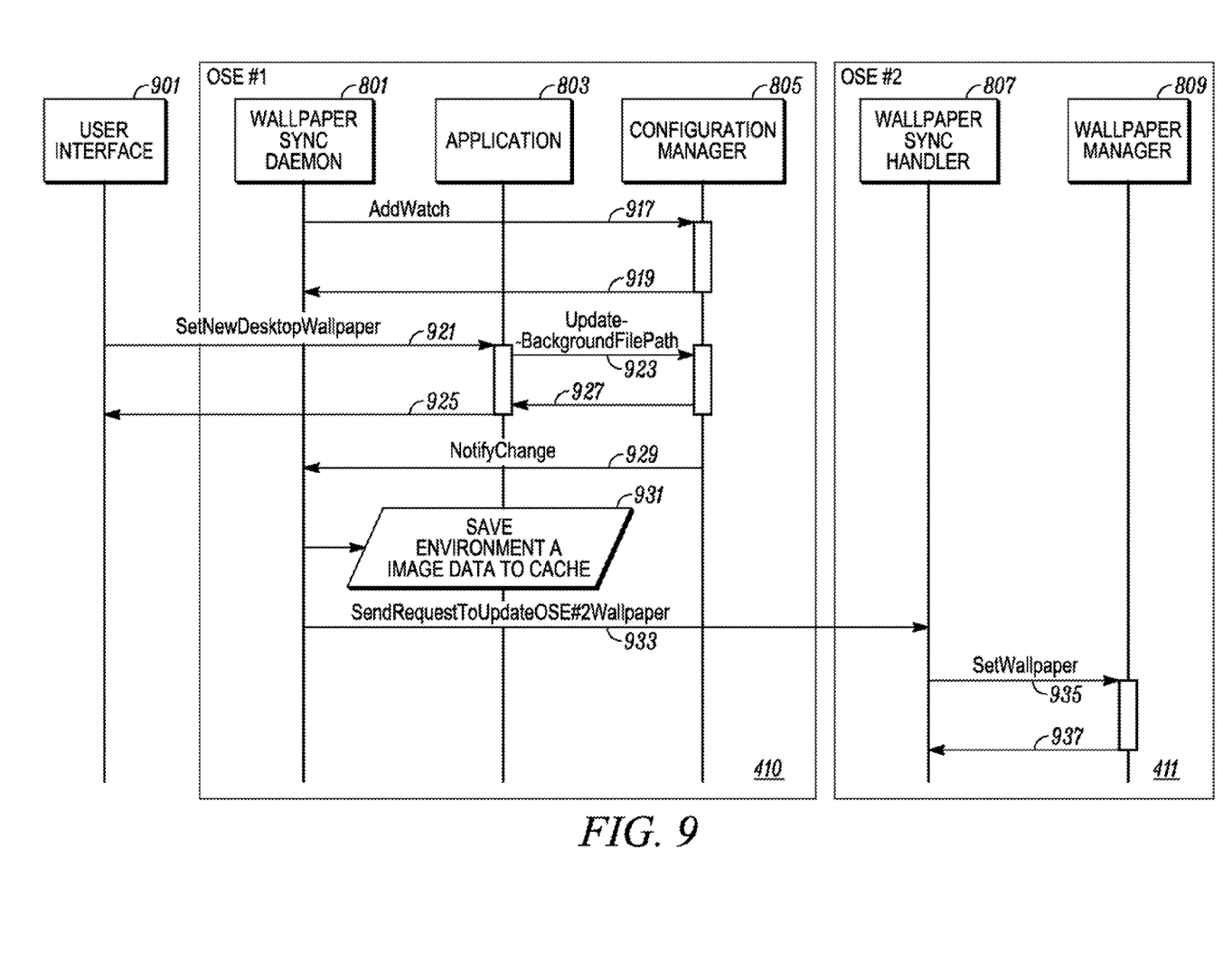
FIG. 9 is a message flow diagram illustrating handling of setting wallpaper in accordance with the embodiment illustrated in FIG. 8.

The wallpaper sync daemon implements an AddWatch 917, 919 process with the configuration daemon 805 to detect user actions that attempt to set an image as a new desktop wallpaper. That is, if for example the user interface 901 sends a SetNewDesktopWallpaper command 921 to the application 803, the configuration daemon 805 will detect this and perform an UpdateBackgroundFilePath 923, 927 with the application 803 to note, or change, the location of the selected or downloaded image data file. The user interface 901 may be informed of the update via message 925. The configuration daemon 805 will then send a NotifyChange 929 to the wallpaper sync daemon 801, the wallpaper sync daemon 801 will save the image data (obtained by OSE #1 406) to cache memory as shown in 931. Transcoding of the image data and other processing such as resizing, scaling, etc. may be performed on the image data at this point. The wallpaper sync daemon will then send a request 933 to update the OSE #2 wallpaper to the wallpaper sync handler 807. The wallpaper sync handle sends a SetWallpaper command 935 to the wallpaper manager 809 and the wallpaper manager 809 responds by confirmation message 937 and sets the wallpaper as the background for OSE #2.

Among other advantages of various embodiments disclosed herein, the user experience is enhanced when setting up wallpaper in a device that uses two or more operating system environments. Using the embodiments, an image data file may be passed from one operating system environment to another, and be useable by the receiving operating system environment as wallpaper. Although the embodiments have been described using examples related to two operating system environments, the various embodiments are not limited to only two operating system environments and can incorporate many operating system environments as illustrated by the plurality of operating system environments shown in FIG. 4. Therefore the wallpaper setup logic 409, in accordance with the embodiments, may handle an image data file obtained by one operating system in a given format, and setup wallpaper using the image data file via another, different operating system environment, where the operating system environments all utilize the common kernel 405.

The various embodiments also include computer readable memory that may contain executable instructions, for execution by at least one processor, that when executed, cause the at least one processor to operate in accordance with the wallpaper setup logic 409 functionality herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices or electronic devices such as those that may benefit from the features of the herein described embodiments. The executable instructions may also include the various operating system environments and the common kernel.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   detecting, by a wallpaper synchronization daemon of a first operating system environment, user input to set wallpaper of the first operating system environment using an image data file;
   in response to detecting the user input to set the wallpaper of the first operating system environment, automatically sending the image data file by the wallpaper synchronization daemon of the first operating system environment to a wallpaper synchronization handler of a second operating system environment along with a request to update wallpaper of at least one of a plurality of home screens of the second operating system environment, the second operating system environment and the first operating system environment being independent from each other, both operating system environments utilizing a common kernel; and
   setting, by the wallpaper synchronization handler of the second operating system environment, the wallpaper of the at least one of the plurality of home screens of the second operating system environment using the image data file, wherein at least one other home screen of the plurality of home screens of the second operating system environment comprises a different wallpaper than the wallpaper of the at least one of the plurality of home screens that was set using the image data file sent by the first operating system environment.

2. The method of claim 1, comprising:
   establishing a bi-directional client-server communication channel between the first operating system environment and the second operating system environment; and
   sending the request to update wallpaper of the second operating system environment, from the first operating system environment to the second operating system environment via the bi-directional client-server communication channel.

3. The method of claim 2, comprising:
   executing wallpaper setup logic, the wallpaper setup logic including a first module contained with the first operating system environment and a second module contained within the second operating system environment; and
   establishing the bi-directional client-server communication channel between the first operating system environment and the second operating system environment where the bi-directional client-server communication channel is between the first module and the second module.

4. The method of claim 3, comprising:
   detecting the user input by the first module and updating a file path for the image data file.

5. The method of claim 4, wherein setting the wallpaper of the second operating system environment using the image data file, comprises:
   setting the wallpaper by the second module of the wallpaper setup logic.

6. The method of claim 5, wherein the first module comprises the wallpaper synchronization daemon and detecting the user input by the first module and updating a path for the image data file, comprises:
   updating the file path for the image data file by a configuration daemon of the first module; and
   sending the request to update wallpaper of the second operating system environment, from the wallpaper synchronization daemon of the first module to the second module.

7. The method of claim 6, comprising:
   receiving the request to update wallpaper of the second operating system environment by the wallpaper synchronization handler of the second module; and
   setting the wallpaper for the second operating system environment by a wallpaper manager of the second module.

8. The method of claim 1, comprising:
   transcoding the image data file to a file format useable by the second operating system environment.

9. The method of claim 1, comprising:
   sizing and scaling the wallpaper for the second operating system environment; and
   displaying on a display, the wallpaper within the at least one of the plurality of home screens of the second operating system environment.

10. The method of claim 1, comprising:
    storing the image data file to local memory cache, after obtaining the image data file from the first operating system environment.

11. An apparatus comprising:
    at least one processor;
    main memory coupled to the processor, the main memory containing executable instructions for execution by the processor, where upon executing the executable instructions the processor is configured to:
      send an image data file obtained from a first operating system environment to a second operating system environment along with a request to update wallpaper of the second operating system environment, in response to user input to set wallpaper of the first operating system environment using the image data file, the second operating system environment and the first operating system environment being independent from each other, both operating system environments utilizing a common kernel independent of virtualization; and
      set wallpaper of at least one of a plurality of home screens of the second operating system environment using the image data file, wherein at least one other home screen of the plurality of home screens of the second operating system environment comprises a different wallpaper than the wallpaper of the at least one of the plurality of home screens that was set using the image data file sent by the first operating system environment.

12. The apparatus of claim 11, where the processor is configured to:
    establish a bi-directional client-server communication channel between the first operating system environment and the second operating system environment; and
    send the request to update wallpaper of the second operating system environment, from the first operating system environment to the second operating system environment via the bi-directional client-server communication channel.

13. The apparatus of claim 12, where the processor is configured to:
    execute wallpaper setup logic, the wallpaper setup logic including a first module contained with the first operating system environment and a second module contained within the second operating system environment; and establish the bi-directional client-server communication channel between the first operating system environment and the second operating system environment where the bi-directional client-server communication channel is between the first module and the second module.

14. The apparatus of claim 13, where the processor is configured to:
detect the user input by the first module and update a file path for the image data file.

15. The apparatus of claim 14, where the processor is configured to set the wallpaper of the second operating system environment using the image data file, by setting the wallpaper by the second module of the wallpaper setup logic.

16. The apparatus of claim 15, where the processor is configured to detect the user input by the first module and update a path for the image data file, by:
detecting the user input by a wallpaper synchronization daemon of the first module;
updating the file path for the image data file by a configuration daemon of the first module; and
sending the request to update wallpaper of the second operating system environment, from the wallpaper synchronization daemon of the first module to the second module.

17. The apparatus of claim 16, where the processor is configured to:
receive the request to update wallpaper of the second operating system environment by a wallpaper synchronization handler of the second module; and
set the wallpaper for the second operating system environment by a wallpaper manager of the second module.

18. The apparatus of claim 11, where the processor is configured to:
transcode the image data file to a file format useable by the second operating system environment.

19. The apparatus of claim 11, comprising:
at least one display, coupled to the processor; and
where the processor is configured to:
size and scale the wallpaper for the second operating system environment; and
display on the display, the wallpaper within the at least one of the plurality of home screens of the second operating system environment.

20. The apparatus of claim 11, comprising:
cache memory coupled to, or integrated with, the processor; and
where the processor is configured to store the image data file to the cache memory, after obtaining the image data file from the first operating system environment.

21. A computer readable, non-volatile, non-transitory memory, comprising:
executable instructions for execution by at least one processor, that when executed cause the at least one processor to:
detect user input to set wallpaper of a first operating system environment using an image data file;
modify the image data file based at least in part on display attributes of a second operating system environment when the user input is detected;
initiate a transmission of the modified image data file from the first operating system environment to the second operating system environment along with a request to update wallpaper of the second operating system environment when the user input is detected, the second operating system environment and the first operating system environment being independent from each other, both operating system environments utilizing a common kernel independent of virtualization; and
set the wallpaper of one of a plurality of home screens of the second operating system environment using the modified image data file, wherein at least one other home screen of the plurality of home screens of the second operating system environment comprises a different wallpaper than the wallpaper of the at least one of the plurality of home screens that was set using the modified image data file transmitted by the first operating system environment.

22. The computer readable, non-volatile, non-transitory memory, of claim 21, wherein the executable instructions, when executed, further cause the processor to:
establish a bi-directional client-server communication channel between the first operating system environment and the second operating system environment; and
send the request to update wallpaper of the second operating system environment, from the first operating system environment to the second operating system environment via the bi-directional client-server communication channel.

* * * * *